Aug. 27, 1963     L. HARTMANN     3,101,994
METHOD OF MOLDING SYNTHETIC RESIN PRODUCTS
Filed June 20, 1958     2 Sheets-Sheet 1

INVENTOR
LUDWIG HARTMANN

BY
ATTORNEYS

Aug. 27, 1963 L. HARTMANN 3,101,994
METHOD OF MOLDING SYNTHETIC RESIN PRODUCTS
Filed June 20, 1958 2 Sheets-Sheet 2

INVENTOR
LUDWIG HARTMANN

BY *Burgess, Dinklage & Sprung*
ATTORNEYS

United States Patent Office 3,101,994
Patented Aug. 27, 1963

3,101,994
METHOD OF MOLDING SYNTHETIC
RESIN PRODUCTS
Ludwig Hartmann, Weinheim an der Bergstrasse, Germany, assignor to Pellon Corporation, New York, N.Y., a corporation of New York
Filed June 20, 1958, Ser. No. 743,310
Claims priority, application Germany Oct. 12, 1957
1 Claim. (Cl. 18—61)

This invention relates to new and useful improvements in molded synthetic resin products and their preparation and is a continuation-in-part of my copending application Serial No. 731,722, now abandoned.

The object of the invention is a novel method for the preparation of molded synthetic resin articles of decorative character and/or relatively high strength.

The foregoing and still further objects of the invention will be apparent from the following description read in conjunction with the drawings in which.

In accordance with the present invention molded synthetic resin articles are produced with the use of at least one predominantly interstitially absorbent, textile fiber fleece of intermingled, preferably polyposed, fibers composed at least in part of thermo-bonding synthetic fibers in self-cementitious, inter-bond with adjacent fibers in the fleece. This fleece is impregnated with a moldable synthetic resin before or as part of the molding operation. It either constitutes a strength imparting or decorative fleece. The decorative fleece may be decorative per se (without additionally applied design) or it is made into a decorative fleece by the application of a design. If a design is applied, this may be effected on the impregnated or the non-impregnated fleece prior to the molding operation. The fleece should have a thickness of at least 0.01 mm. and should be substantially thicker for strength imparting characteristics, the maximum thickness being determined by the article itself. Decorative fleeces however should be preferably of a thickness of about 0.01–6 mm. If relatively heavy, it may be subjected as such to a molding operation. In any case, it may be used with other moldable or premolded material to form an inlay therein as an integral part thereof. Such inlay when decorated is then normally provided adjacent to or as part of the surface of the molded article to assure the visibility of the design, as hereafter more fully set forth.

The "molded synthetic articles" to which the invention pertains comprise articles molded of conventional synthetic thermoset or thermoplastic resins obtained by conventional molding procedures, such as pressure-molding, casting, injection molding, etc., as may be applicable to a particular resin, and using conventionally known thermosetting or thermoplastic molding materials.

The expression "interstitially absorbed" or "interstitially absorbent" or similar designation as used herein in connection with a fleece in accordance with the invention is intended to connote absorption of or absorption capacity for liquid impregnants within the interstices between fleece fibers, as distinguished from capillary absorption or absorption capacity within the fibers per se.

The terms "self-cementitious bond" or "self-cementitious interbond" or "self-cementitious bonding" or similar expressions used herein in designation of an interfiber bond for the decorative fleece containing or consisting of thermo-bonding fibers in accordance with the invention, or the procuring thereof, is intended to mean the bond obtained or to be obtained through cementitious attachment between contacting fibers in which at least the fiber contacting surface of the thermo-bonding fiber surface itself furnishes the cementitious bonding material when within the temperature range of cementitious bonding.

The term "thermo-bonding fiber" or similar expression is used herein in its broadest sense to connote any synthetic fiber capable of at least surface coalescence upon contact with a fiber of the same material while within the temperature range of cementitious bonding and includes not only a normally thermoplastic fiber but also one which is or may be made thermoplastic by the use of a suitable swelling agent or solvent for the fiber material, in which case the temperature range of cementitious bonding may be as low as room temperature or lower. Thus, the term "thermo-bonding fiber" within the scope of this invention includes solvent-plastic synthetic fibers, i.e. fibers of normally insufficient range of thermoplasticity but solvent convertible into thermoplastic fibers within the above definition and even though they subsequently lose or are deprived of the solvent after self-cementitious fiber bonding has been effected.

The thermo-bonded fleece in accordance with the invention may be used as such in the molding step together with suitable molding resin which will fill the fleece pores during molding and integrate the fleece. Alternatively, the thermo-bonded fleece may be first impregnated with a thermosetting or thermoplastic resin and thereafter subjected to molding.

The thermoplastic synthetic fiber usable in accordance with the invention and which is to self-cementitiously bond with adjacent fibers (at fiber crosspoints or fiber overlays) is so selected that its temperature of destructive flowability at the highest predetermined molding pressure it is to undergo, i.e., its melting temperature, or, the temperature at which its viscosity is destructive of the shape of the material at said pressure, is above the highest predetermined fleece molding temperature to which the fleece is heated at said pressure during the molding operation in which it participates.

The term "temperature range of cementitious bonding" as used herein is intended to designate that temperature range within which the thermo-bonding fiber material has a viscosity sufficient for at least surface coalescence of contacting portions of the same thermo-bonding material but of insufficient flowability to be destructive of the retention of the general shape of that material. It is sometimes possible to lower the temperature range of cementitious bonding of a given, normally thermoplastic material by the presence of various materials and especially of solvents or swelling agents. Such a lowered temperature range of cementitious bonding may remain the same for the thermoplastic material after it has emerged from the temperature treatment of the fleece, as hereafter more fully described. On the other hand, in certain cases and particularly when solvents or swelling agents have been used for the lowering of the temperature of cementitious bonding or for converting a normally non-thermoplastic or insufficiently thermoplastic (as to temperature range) material, the heat applied during the bonding operation in the making of the fleece in accordance with the invention may remove sufficient or all of the solvent or of the swelling agent, so that the thermoplastic fiber component of the fleece has a higher temperature or temperature range of cementitious bonding or of destructive flowability than it did when it entered the fleece bonding step.

The thermo-bonded textile fiber fleece, impregnated or not, may be positioned over one or both surfaces of a conventional thermosetting or thermoplastic resin molding powder in a conventional thermosetting or thermoplastic mold, and the molding operation thereafter effected in the conventional manner. When using thermosetting molding powder the same may be premolded without complete curing, the thermo-bonded fleece applied to one or both surfaces and thereafter the curing of the article completed in the mold. Alternatively, one or preferably several layers of thermo-bonded and resin-impregnated fleece may be positioned in the mold as such, comprising the molding material, and the molding thereafter effected in the conventional manner. For injection molding the decorative fleece, preferably resin-impregnated, is placed onto an injection mold and then subjected therein to conventional injection molding with a conventional thermoplastic injective molding resin material.

The fleece may have a design thereon, the term "design" being used herein and in the claim to designate any indicia or decoration, including those of an aesthetic and/or functional nature, whether applied to the fleece or inherent therein. The material of the design or component thereof should be compatible with any contacting resin and with the ultimate molding materials. This is particularly true of painted or printed designs. The contacting resin (or other molding compound) should not exercise any solvent action on such designs, nor should the resin have any action on the solvent base of the design. Unless these precautions are taken smudging of the decoration may result. There may be, however, certain instances in which smudging may be an intended aspect of the design.

The designation of "textile fiber fleece" as mentioned herein is intended to connote a non-woven sheet structure of a fiber skeleton as conventionally understood in the art and, for instance, exemplified in U.S. Patents 2,719,795; 2,719,802; 2,719,803 and 2,719,806. Such fiber fleeces may be prepared in the conventional manner, either by superimposing multiple individual thinner webs of intermingled fibers or by making a thicker, substantially single-layer fleece. Individual fleece webs may be prepared by carding, using for instance conventional carding rolls, or by flocculation, using for instance conventional flocculation suction drums. If carded fleeces are to be used with at least some polyposed fiber arrangement, multiple thin webs are superimposed at an angle with respect to the principal direction of fibers in the individual webs, to thereby obtain a multitude of cross-points between fibers composing the aggregate fleece. Suction flocculation-prepared fiber fleeces normally already possess polyposed fibers. The preparation of the initial, i.e., "loose" fiber fleece (thin or heavy) is preferably carried out in a continuous manner in accordance with conventional methods and equipment, to give fleece webs of considerable length, thus permitting substantially continuous operations, including fiber bonding and/or impregnation.

In the preparation of a multiple layer fleece usable in accordance with the invention, from 2 to about 30 or more thin webs of fibers, such as stable, may be used, each component web preferably having a thickness of about 0.1 to 1.2 millimeters or higher and weighing about 5-35 grams or more per square meter.

The fiber fleece structure to be used for thermo-bonding in accordance with the invention should be from about 0.1 to about 60 millimeter thickness to prepare therefrom an interstitially absorbent thermo-bonded fleece of about 0.01 to 6 millimeter thickness and should be correspondingly thicker for a thicker thermo-bonded fleece. Thermo-bonded fleeces of a thickness in excess of 6 millimeters however may subject an applied design to undesirable distortion, while those of less than 0.01 millimeter thickness may prove too weak for design application or molding.

The new fiber fleece as it is initially obtained for thermo-bonding and useful in accordance with the invention, should contain at least about 10% by weight, and preferably about 20-60% by weight of thermo-bonding fibers, and preferably additionally at least 5% by weight and advantageously about 40-80% by weight of fibers which are non thermo-bonding in relation to the first mentioned thermo-bonding fibers.

Within a preferred embodiment of the invention the fiber mixture in the loose fiber fleece should contain resilient synthetic fibers of the type of polyamides, polyesters, cellulose triacetate and high molecular polyolefins, such as polyethylene and polypropylene. These may be present in the fleece to constitute a portion or all of the thermo-bonding and/or non-thermo-bonding (if any) fibers present. Good results are obtained with a content of such synthetic fibers of at least 40% by weight of the total aggregate of the fibers present.

The designation "non-thermo-bonding" fibers, as used herein, is understood as being relative to the thermo-bonding characteristics of the fibers hereinabove referred to. Accordingly, non-thermo-bonding is intended to connote the absence of bonding action of the fiber so designated at the temperature at which the thermo-bonding fibers in the fleece structure would act to coalesce and thereby bond together the contacting fiber areas, In other words, even though one given fiber may have thermo-bonding characteristics at a given temperature and pressure, it may be considered within the scope of this invention a non-thermo-bonding fiber if mixed with a fiber exercising a thermo-bonding action under temperature conditions at which the first mentioned fiber does not so act.

The length of the component fibers of a fiber fleece useful in accordance with the invention should be at least 10 millimeters and preferably about 20–50 millimeters, but should in no event exceed about 70 millimeters. Although mixtures containing some shorter fibers, such as of about 1.5–10 millimeters may be used, the content of such shorter fibers should preferably not exceed 15% by weight of the aggregate fibers present in the fleece.

Suitable thermo-bonding fibers in accordance with the invention are, for instance, polyamides and particularly 6 nylon, 66 nylon, 610 nylon, polyesters, and particularly polyethylene terephthalate, cellulose triacetate, higher molecular polyolefins, and particularly polyethylene and polypropylene and further thermoplastic materials of the type of polyvinyl compounds, cellulose acetate (2.5) and lower molecular polyolefins, such as polyethylene and polypropylene. As above stated, the application of solvents or swelling agents causes a reduction and/or extension of the softening ranges or melting points or ranges of certain types of fibers, and it is thus possible to make suitable adjustment in accordance with particular demands. This is notably true of polyamides and polyesters.

Non-thermo-bonding fibers useful in accordance with the invention may be any of the foregoing fibers enumerated as "thermo-bonding" when in admixture with another fiber of the same group which exercises a bonding action under the particular pressure/temperature conditions used, while said first mentioned fiber does not so act. In addition, a variety of other fibers and fiber mixtures may be used as non-thermo-bonding fibers, provided that they remain stable and unaffected by the temperature/pressure requirements of bonding for the thermo-bonding component. Such suitable non-thermobonding fibers are, for instance, vegetable fibers, such as cotton, flux, ramie and jute fibers; animal fibers, such as wool, goat hair, camel hair or human hair; synthetic fibers of the type of rayon, spun rayon; furthermore alginate fibers, protein fibers and mineral fibers, such as glass, rock or asbestos fibers and the like may be used. Also, waste fibers, such as wool-comber-waste; torn wool, cotton waste, torn cotton may also be used as such or in mixture with any other fibers herein mentioned.

Thermo-bonding of fibers in accordance with the invention may take place between thermo-bonding fibers or between thermo-bonding fibers and non-thermo-bonding fibers.

In accordance with a practical application of the invention, a suitable loose fiber fleece constituted as hereinabove set forth, is first converted into an interstitially absorbent fiber-bonded skeleton structure by subjecting the loose fleece to compression and temperature conditions causing contact between adjacent fibers while the fiber surface is at a temperature within the temperature range of cementitious bonding for the thermo-bonding component of the fleece, the time of treatment being insufficient to produce that destructive flowability within the individual fibers at which appreciable loss of their structure results. This thermo-bonding of the initially loose fleece structure may be conveniently accomplished by passing the loose fleece through the gap or nip of heated pressure rollers. The compression applied to the loose fleece is then determined by the roller gap, i.e., the distance between the closest surface points of the pressure rollers in relation to the thickness of the fleece.

An alternative method of securing fleece compression in accordance with the invention is the passing of the fleece between the roller and the felt of a "decating" type device, as is well known to the textile industry. The desired fleece compression may be obtained in that case by adjusting the felt tension against the roller.

The compression for obtaining suitable fleece bonding bears a definite relation to the relative interstitial absorbency of the bonded fleece for the resin impregnant. If the pressure is carried too far, a relatively thin, dense product with no or insufficient interstitial absorbency is obtained. It may be, therefore, necessary in certain cases to empirically determine the required compression in relation to the resin to be absorbed, the thickness of the fleece and of its particular fiber components. This is conveniently done by preparing a number of fleeces and subjecting them to different compressions, i.e., definite roller distances or gaps, and ascertaining in each case the absorbability with respect to a suitable thermo-setting resin solution or suspension (both being hereinafter and in the claims designated "solution") and selecting that compression for which the solution will provide at least about 25%, and preferably about 40–70% by dry weight of resin impregnant, calculated by dry weight impregnated material. The concentration of the test solution to be used as the impregnant is preferably selected as high as possible while yet possessing sufficient fluidity to readily penetrate into the absorbent fleece.

As a general rule, setting of roller gaps equivalent to 0.2–10% of the initial thickness of the fleece subjected to the bonding operation, will give the desired interstitial absorbency while assuring a high degree of inter-fiber contacts. The latter can be further improved for any fleece structure, in accordance with the invention, by the inclusion of crimped fibers as part of the fiber components of the fleece.

The thermo-bonded fiber fleece may be then impregnated with a thermosetting or a thermoplastic resin. This impregnation may be effected by either padding or spraying the fleece with a suitable resin solution or by dipping the fleece into such solution. Such impregnation may be carried out by conventional means and preferably in a continuous manner on a continuously moving fleece web, as is well understood in the art.

The thermosetting or thermoplastic resins usable in accordance with the invention, whether for decorative fleeces and/or support fleeces, are those conventionally used for the production of molded thermoset or thermoplastic articles. This is also true of any additional molding materials, such as molding powders, injection molding materials, etc., if such are used in conjunction with the novel fleeces in accordance with the invention. Particularly good results have been, however, obtained with such thermosettable materials as Melamine resins and phenol aldehyde resins and particularly phenol formaldehyde resins; and with such injection moldable thermoplastic materials as polystyrene.

In accordance with conventional practice for the molding of thermosetting resins, suitable setting accelerators may be incorporated in the thermosetting resin composition used. Inasmuch as variations in amount of accelerator used are inversely proportional to the time required for obtaining a given final setting result, it is possible to adjust the setting time required for the impregnant resin of a fiber fleece used in accordance with the invention to be substantially equivalent to the setting time or balance of setting time required for a thermosetting molding material to be used in conjunction with the impregnated fleece. This is especially of importance in those cases in which different, though compatible, thermosetting resins are used. It is furthermore important in those cases in which it should be desired to preform an article and thereby partially set the same before applying thereto the impregnated fiber fleece. Thus, by adjustment of accelerator, one, more or all of the components participating in the molding operation in accordance with the invention, may be adjusted to be capable of substantially the same degree of thermosetting within substantially the same period of time of the molding operation leading to the desired finally set article.

The thermosetting or thermoplastic resin usable as an impregnant for the thermo-bonded fiber fleece in accordance with the invention should be the same as, or compatible with, the resin used in any additional thermosetting or thermoplastic resin material intended for the preparation of the ultimate molded article. By compatibility in this connection is meant that the impregnant resin is capable of blending together with such additional resin under the pressure/temperature conditions of the molding operation to form therewith a substantially unitary integral article. Compatibility thus readily exists between different types of Melamine resins, different types of phenol aldehyde resins and between Melamine and phenol aldehyde and particular phenol formaldehyde resins, and between different thermoplastic resins.

The impregnant resin, as mentioned, is used in suitable solution or suspension and at a concentration not exceeding that assuring ready penetratability of the resin solution into the absorbent fiber fleece. To this end wetting or viscosity-reducing agents may be employed. In all cases, however, any component parts of the impregnant resin solution, and particularly solvents and wetting agents, should be substantially inert with respect to the fiber components of the fleece and the resin used as the impregnant.

The concentration of the impregnant resin solution should be, however, sufficient to leave on the impregnated fleece after drying at least about 25%, and preferably at least about 40% dry weight of interstitially held resin by dry weight of the finished impregnated fleece. Preferred resin concentrations for impregnation are those leaving about 40–70% of total dry weight impregnant resin by total dry weight of impregnated fleece. The resin-impregnated fleece is dried, preferably after removal of excess resin solution in conventional manner, such as by passing the goods through squeegee or similar type rollers. Caution should be observed that the drying time and temperature are effected to avoid any appreciable setting or partial setting when thermosettable resins are used.

Interstitially held resin material may be readily determined in conventional manner, as is well understood in the textile impregnating and finishing art.

The following is a practical illustration of a fleece thermo-bonding operation in accordance with the invention:

A fiber fleece is passed through the gap of a heated stainless steel roller pair at a fleece thickness to roller gap ratio of about 30:1–80:1, thereby thermo-bonding contacting fibers. Passage through the roller gap also serves to effect a surface compacting and smoothing of the fleece. The fleece is then passed through a tank beneath the surface of the thermosetting resin solution and is thus impregnated with the solution. Upon passing out of the solution, excess resin is removed by passage through the gap of a squeezing roller pair which may, for example, be formed of rubber, and the fleece, impregnated with the desired resin content, is then dried in the conventional manner as, for example by being passed through a drying chamber, which may be provided with radiant heaters and/or hot gas blowers. The drying temperature and time should be so controlled to prevent too extensive a hardening or curing of the resin. The dried web emerging from the drying chamber is then cut or punched into the desired shapes for the molding operation as described in further detail hereinafter.

For the molding operation the impregnated fleece, cut to the desired size or shape, is placed in the cavity of a conventional mold. In order to obtain the desired mass in the finished article, a relatively thick fleece or preferably a multiple number of layers of impregnated fleeces, may have to be used in the mold. In this connection, it is not necessary that all of the fleece layers be thermo-bonded prior to the impregnation and subsequent operation. It is, however, necessary to have at least one outer fleece, and preferably also the other outer fleece, in fiber thermo-bonded form. In this case the outer fleece or fleeces may be relatively thin, and one or both of the outer fleeces may additionally serve to give a decorative character to the ultimate character to the ultimate molded article, as, for example, by having a decoration applied thereto. The structure thus placed in the mold is then subjected to the molding operation in the conventional manner by closing the mold with the application of heat and pressure (if applicable). The fleeces may be preheated prior to the molding operation proper in order to render the same more pliable and workable.

It is also possible to use the impregnated fleeces in conjunction with conventional molding resin material, such as thermosetting molding powder. For this purpose, the molding powder may be placed in the mold in the conventional manner and the mold closed with the application of heat-pressure, and the mold thereafter opened when the article has been preformed but not completely cured or set. Thereafter, the impregnated fleece may be placed over one or both surfaces of the preformed article, the mold again closed with the applicaiton of heat and pressure, and the curing or setting operation completed.

Alternatively, the impregnated fleece may be positioned over one or both surfaces of the molding powder with the same positioned in the mold, and the molding completed in a single operation.

As above pointed out, the molding operations may also be carried out with a thermo-bonded, non-impregnated fleece. It is in that case desirable, however, that the molding resin used is sufficiently liquid under the initial temperature pressure of the molding operation to insure rapid and complete penetration of the resin.

In all cases a unitary article is formed with the fleece, forming an integral part thereof imbedded in the article.

The use of thermo-bonded single or multiple fiber fleeces will give articles of high strength and thus permit the reduction of wall thicknesses of the molded material. This does not only effect a substantial saving in weight and cost of materials but also permits the production of many utilitarian articles, such as those commonly made of china and especially dinner and decorative ware, for which relatively thin wall thicknesses are in aesthetic demand by the public, while at the same time relatively high strength and preferably also a reduced weight without being too light, is desired.

A design may be applied to the impregnated or non-impregnated fleece in the conventional manner as, for example, by printing, painting, silkscreen, metallizing, or the like, or, decoration can be achieved by means of a fiber structure per se. When a design is applied, the same is preferably applied to the fleece prior to impregnation, and the thereafter-impregnated fleece is placed face-up into the mold as an outer surface layer. Alternatively the design may be applied as a mirror image to the impregnated fleece, and when the decorated fleece is positioned in the mold, the same should be then positioned on the outer surface layer of the molding material, with the designed side face-down, i.e., facing away from the ultimate outer surface of the article. The design will thus be imbedded in all cases beneath a surface layer of resin in the finished article and be protected. In this connection, the mirror image design-carrying, impregnated fleece should have a thickness not exceeding that which will permit the face-downwardly applied design to be readily seen after the completion of the molding operation. This depends to some extent on the resin used for the impregnation, which preferably should be non-pigmented.

Particularly pleasing results are achieved when applying to the outer surface of an impregnated thermo-bonded fleece, a thin coating of an alpha cellulose containing resin. The resin should be compatible with the impregnant resin (if any) and the molding materials. The alpha cellulose is one conventionally used in plastic molding and especially in connection with thermosetting molding compositions. The alpha cellulose-resin coating composition useful in accordance with this embodiment of the invention is applied to the impregnated fleece, before or after drying of the fleece impregnant, in substantially viscous or pulpy form. Suitable concentrations are, for example, obtained with 5–15 and preferably about 10 parts by weight of alpha cellulose and a resin solution containing 60–80 and preferably about 70 parts by dry weight of resin. A typical composition is, for instance, one containing about 10 parts by weight of alpha cellulose and 70 parts by weight of Melamine (used in Example 1). The relative heaviness of the coating is not critical as long as the same is on the one hand continuous, and on the other hand does not have a thickness which will interfere with the desired visibility of the design. The coating composition may be applied and any excess removed (as by a doctor blade) in conventional manner. An unexpected advantage of such applied coating is that it causes the fibrous fleece structure, which is noticeable at the surface of the molded article, to partly or completely disappear. Furthermore, a highly glossy, smooth surface, which may approach that of the finest china, is obtained. Furthermore, a certain degree of slight roughness, occasionally occurring at the decorative side of the final article, is completely eliminated by the additional coating herein described.

For decorative purposes fleeces may also be used as such, i.e., without thereto applied design. In that case, at least the outer layer of a decorative fleece carries a fiber structure of a contrasting color to that of the impregnant resin, in which case the contrast may be obtained by the dyeing or pigmentation of the fleece structure and/or of the impregnant resin or of both. Alternatively, and especially if the fiber structure of the fleece is relatively thin, the desired contrast may be obtained by way of contrast dyeing or pigmentation of the underlying molded article material relative to the decorative fleece in which the fiber structure, as such, may furnish the contrast in its normal state, or may be composed of dyed or pigmented fibers. Particularly pleasing effects are obtained when the fiber arrangement of at least the outside of the fiber fleece intended as decoration per se, is composed of fibers arranged predominantly in substantially parallel extension, as may be obtained for instance by carding or similar procedure. It is, of course, also possible to combine the decorative features of fiber contrast with the additional application of a suitably applied design.

Inasmuch as most fibers, and particularly synthetic fibers (heat-settable by additional crystallization from amorphous domains) may undergo fairly appreciable shrinkage when subjected to heat, the fleece surface may become puckered or wrinkly, in for instance the fiber-bonding step or during the molding operation. This may create a desirable decorative effect. On the other hand, when using at least 5 and preferably 10–30% of a substantially non-bonding fiber as hereinabove set forth and defined, such puckering and wrinkling of the fiber skeleton, particularly during its fiber thermo-bonding operation, may be avoided thereby, assuring a relatively smooth surface for the resin-impregnated product. This may be important in connection with the application of certain designs, such as by printing, silk screen application or the like, and especially where details of design or dimensions are of value.

Generally in the molding of synthetic resin articles containing or consisting of impregnated fiber fleeces in accordance with the invention, it is desirable to precut the fleece to substantially the circumferential dimensions of the article to be molded, making allowance for such shrinkage or "pulling in" as may result in the molding operation. Although the fleece or the fleece aggregate, as the case may be, may be used in the female portion of the mold in substantially flat condition, to be thereafter deep-drawn, it is in many cases desirable for either concave or convex surfaces to apply the fleece or fleeces in substantially funnel shape by cutting out at least one segment of fleece material to avoid heavy and extensive double-layering of fleece material.

Figure 1:
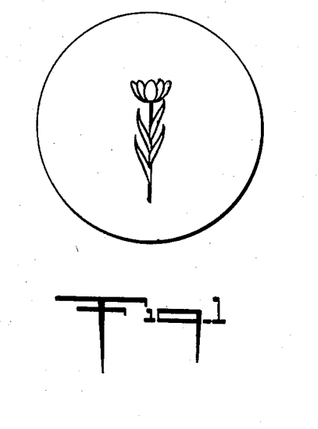
FIG. 1 is a plan view of a piece of prepared textile fleece having a design applied thereto.

As shown in FIG. 1 of the drawing, the impregnated fleece may be cut to a suitable shape, such as a circular shape, and a design in mirror image applied thereto. The fleece insert may then be placed in the female mold cavity 9 of the mold 9, 10. In this case the insert may be placed as a top layer over a suitable amount of molding powder and the mold closed with the application of heat and pressure to complete the molding in a single operation. The fleece insert 7 is so applied that the design is face down, i.e., facing the molding powder. Furthermore, a further insert of the impregnated fleece may be positioned at the opposite surface of the molding powder so that, in effect, the molding powder is sandwiched therebetween.

Alternatively, the molding powder may first be preshaped by closing the mold and opening the mold before complete setting has resulted. Thereafter the insert 7 is applied to the top surface and, if desired, a further impregnated fleece insert to the bottom surface of the preformed article, and then the mold closed, completing the molding operation.

Alternatively, in place of the molding powder, and particularly where extra strength is desired, a thicker layer or multiple layers of impregnated fleeces, may be used. In this connection, the intermediate layer or layers of the impregnated fleece need not be pre-bonded, although the outer layer, such as the layer 7, is thermo-bonded as herein set forth.

Figure 2:
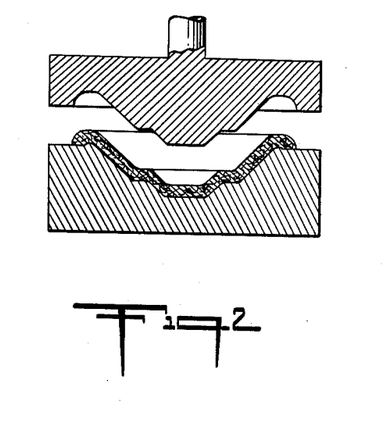
FIG. 2 is a diagrammatic vertical section of a molded bowl in a mold.
Figure 3:
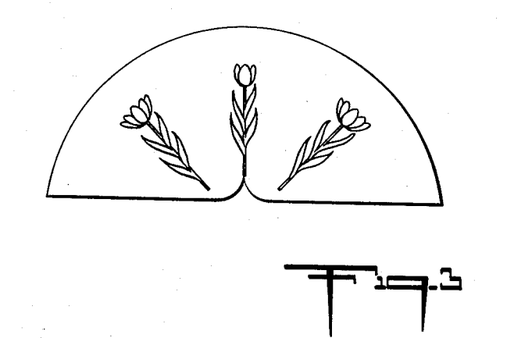
FIG. 3 is a plan view of a decorated prepared textile fiber fleece for the molding of a cup.
Figure 4:
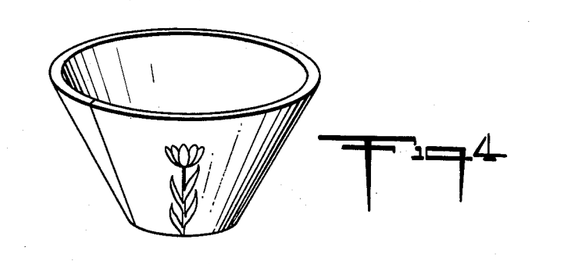
FIG. 4 shows the fleece of FIG. 3 preshaped for the molding operation prior to introduction into the mold.

FIG. 2 is illustrative of the molding operation (in that case a bowl). As shown in FIG. 3, the impregnated fleece, with the design applied thereto, is cut so that the same may be roughly shaped in the form of a cup, as shown in FIG. 4. A multiple number of layers of fleece or a thick layer of fleece may be cut in this manner and shaped into the rough-formed cup as shown in FIG. 4.

Figure 5:
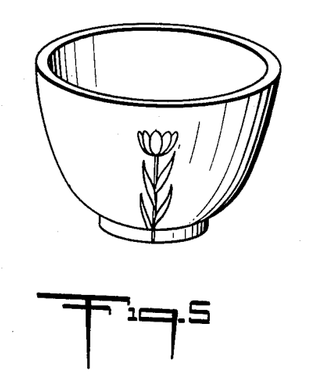
FIG. 5 shows the formed cup after the molding operation.

The rough-formed cup may then be placed in the mold with the application of heat and pressure, and accurately molded into the cup as shown in FIG. 5. This mode of operation prevents a severe distortion of the material when molding deep articles, or deeply curved articles, such as the cup shown.

Figure 6:
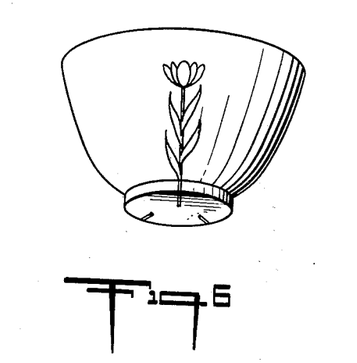
FIG. 6 is a perspective view of the cup shown in FIG. 5.

The extent to which deformation is avoided on even relatively sharp edges is illustrated in FIG. 6 showing the perfect carrying through of design shown on FIG. 4 over the lower edge of the finished cup of FIG. 5.

Figure 7:
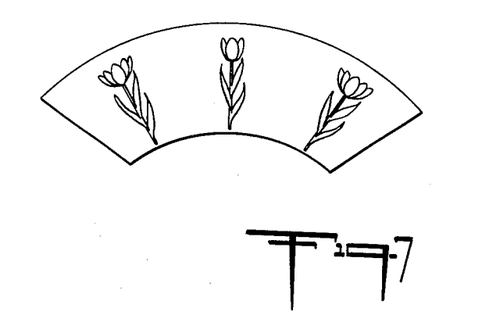
FIG. 7 illustrates a plan view of a decorated fleece for a bowl.
Figure 8:
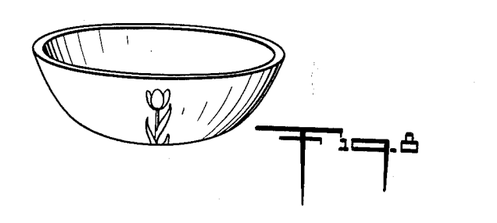
FIG. 8 shows a molded bowl, made with the decorated fleece of FIG. 7.

FIG. 7 illustrates a fleece cut-out, typical for the molding of a bowl as represented by FIG. 8.

Attempts have been made in the past to use resin-impregnated sheets with thereto applied designs for molded thermoset resin articles. The proposed sheets are in the form of inserts composed of resin-impregnated cellulosic material, such as paper, upon which a suitable design is applied, such as by painting or printing. Their use, however, has proved unsatisfactory in that they are limited to relatively flat surfaced objects, such as flat plateware or the like, and they are even then subject to a relatively high percentage of failures because of distortion and rupture of the sheet occasioned by the molding pressure. It is not at all possible to successfully use such sheets in connection with highly curved surfaces, edges, or in molding operations with a deep-drawing effect. Furthermore, such sheets cannot be used directly in combination with molding powder, but always require a two-step molding operation in which the article is premolded with partial thermosetting, whereupon the mold is opened, the sheet applied, the mold reclosed and then the thermosetting completed.

Still further, such impregnated cellulosic material sheets are brittle and easily injured in handling, or in the application thereto of a suitable design. Furthermore, the pleats and faults resulting from the application of sheet material against even lightly concave article surfaces, are in many cases noticeable after the molding operation, while the stresses imparted when pressing such sheets against even lightly convexly curved article surfaces, cause damage to or rupture of the sheets.

The cellulosic material in these previously proposed sheets has been discovered to have a high capillary absorbability for the impregnant resin, so that the fiber structure is weakened and/or partly or completely destroyed. At the same time these cellulosic sheets are relatively so dense that they possess comparatively little interstitial absorbency for impregant resin.

The thermo-bonded fiber fleeces prepared and used in accordance with the instant invention overcome the above mentioned difficulties and drawbacks of impregnated sheets of cellulosic material. They are relatively ductile and pliable and yet present a surface readily adapted for the painting, drawing or printing thereon of a suitable design. They can be handled without difficulty or danger of injury. They permit and withstand a one-step molding operation in conjunction with additional molding material, be it additional impregnated fleece material and/or molding powder, thereby eliminating the necessity of premolding before applying the insert. The decorated novel fleeces permit their application to highly curved surfaces of inner or outer diameters, to relatively sharp edges, and to molding operation with a deep drawing effect. Additionally, they impart strength to the molded article and particularly when used in conjunction with other impregnated fleece material, and, as hereinabove described, decorative articles including those having highly curved surfaces and especially cups, bowls, and the like, may be made with relatively thin walls and without damage to the design or distortion caused by pleats or faults such as caused by application to concave surfaces. As above pointed out, those benefits result, at least in part, from the high interstitial absorbency for resin material of the decorative fleece, in accordance with the invention. This asserts itself especially since the decorative fleece is predominantly composed of fibers having a relatively low or negligible capillary absorption for the resin impregnant or the resin molding composition. This is especially true of such fibers as the polyamides, polyesters, polyolefins and polyvinyls.

The following examples are furnished by way of illustration, all fiber fleeces mentioned being conventionally produced by known methods, such as carding, flocculation, or the like, and all amounts or percentages or ratios specified being by weight unless otherwise stated:

*Example 1*

A random-fiber fleece of about 56 grams/m.$^2$ was prepared from 1.5 den. nylon 6 fibers (not dulled) 25 mm. length and 1.8 den. acetate fibers (degree of acetylation about 3) 20 mm. length in a mixture ratio of 25:75. The thickness of the unit was 7 mm. The fleece web was passed at a rate of 7 m./minute between two heated steel rolls with a roll gap of about 0.05 to 0.1 mm. and at a temperature of 211° C. and thereby thermo-bonded. The final product had a thickness of about 0.1 mm. The product produced in this manner was treated (by immersion) with a solution of 60 parts by weight of a water-soluble precondensate of Melamine-formaldehyde resin (as for instance marketed by the American Cyanamid Company under the designation Cymel-Melamine-Resin 405), 32 parts water, 8 parts ethyl alcohol and 2 parts of a 50% aqueous solution of triethanolamine hydrochloride (acceleration). By squeezing between two rubber rolls, the product was brought to a resin absorption of 65% (dry basis). The fleece impregnated in this manner was dried at 90° C. on a heated roll down to a content of volatile components of 5%. A flexible sheet is obtained which will not break apart even when scored. Colored pictures were printed on this fleece by screen-printing.

In the cavity of a bowl mold which was preheated to 160° C., there was introduced a conventional alpha-cellulose-filler containing Melamine molding composition in granular form (as for instance marketed by the Ciba Co. under the designation Melopas MV). The quantity was such that a small excess was present. The mold was then closed by means of the upper die and brought to a pressure of 380 kg./cm.$^2$ at a temperature of 160° C. After 20 seconds, the pressure was released, and after 1 minute the mold was opened again. The bowl was now preshaped, but the Melamine resin was still not cured. The decoration fleece, cut as illustrated, in FIG. 7, was now placed on the preformed article, with the decorated side down. The mold was again closed and cured for 2½ minutes under the above mentioned conditions. The finished bowl was then removed from the mold. The decorative fleece remained intact and was not in any way impaired in the molding operation and the design remained undisturbed.

*Example 2*

A random-fiber fleece web of 50 grams/m.$^2$ was prepared from cold-drawn 1.2 den. polyester (ethyl glycol terephthalic acid ester) fibers 25 mm. length and from the same but undrawn 6 den. fiber 25 m. length in a mixture weight ratio of 80:20. The thickness of the unit was 7 mm. The fleece web was passed between two heated steel rolls at a rate of 7 m./minute with a roll gap of about 0.05 to 0.1 mm. at a temperature of 211° C. and thereby thermo-bonded. The final product had a thickness of 0.1 mm.

Colored pictures were printed by offset printing on the fleece produced in this manner.

After the printing, the thermo-bonded fiber fleece web was treated (by immersion) with a solution of 60 parts by weight of a water-soluble precondensate of Melamine formaldehyde resin (as identified in Example 1), 32 parts of water, 8 parts of ethyl alcohol and 2 parts of a 50% aqueous solution of triethanolamine hydrochloride (accelerator). By squeezing between two rubber rollers the web was brought to a resin absorption of 65%, dry weight basis. The fleece impregnated in this manner was dried at 90° C. on a heated roll down to a content of volatile components of 5%.

Alpha-cellulose filler containing Melamine resin molding composition as used in the previous example, but in powder form, was introduced into the die of a plate mold preheated to 160° C. The powder was distributed uniformly in the cavity of the mold. On top of the powder there was placed a circularly cut decorative fleece produced in the manner described above. The mold was closed by means of the top die and brought to a pressure of 380 kg./cm.$^2$, at a temperature of 160° C. After 20 seconds the pressure was released for venting and then reapplied for curing for 3½ minutes. The finished plate provided with the decoration pattern was then removed. The impregnated decorated fleece and the finished article showed the same characteristics and finish as in the preceding example.

*Example 3*

*Decorative fleece.*—A random-fiber fleece web of about 50 grams/m.$^2$, consisting of 1.5 den. nylon 6 fibers (not dulled) 40 mm. length and 3 den. acetate fibers (degree of acetylation about 3) 40 mm. length, was prepared in a mixture ratio of 50:50. The thickness of the unit was 7 mm. The web was passed between two heated steel rolls at a speed of 7 m./minute with a roll gap of about 0.05 to 0.1 mm. and a temperature of 213° C. and thereby thermo-bonded. The final product had a thickness of about 0.1 mm. A design was then applied by metallizing. The decorated product produced in this manner was treated with a solution of 60 parts of a water-soluble precondensate of Melamine formaldehyde resin, as previously identified, 32 parts of water, 8 parts of ethyl alcohol and 2 parts of a 50% aqueous solution of triethanolamine hydrochloride (accelerator). By squeezing between two rubber rolls, the product was brought to a resin absorption of 65% (dry weight basis).

*Support fleece.*—A loose fiber fleece web of 250 grams/m.$^2$ consisting of nylon 6 fiber waste of 3–7 den. and cotton waste white was prepared in a mixture ratio of 50:50. The fiber web was treated with a solution of 60 parts of a water-soluble precondensate of the same Melamine formaldehyde resin, 32 parts of water, 8 parts of ethyl alcohol and 2 parts of a 50% aqueous solution of triethanolamine hydrochloride. The final product had a resin content of 60% (dry basis).

Into the die fo a plate form preheated to 160° C., there were placed round punched pieces of the second mentioned fleece web in sufficient quantity to produce a plate of the desired weight. As uppermost layer, there was applied a round punched-out piece of the first mentioned fleece web. The mold was then closed by means of the top die and brought, at a temperature of 160° C., to a pressure of 380 kg./cm.$^2$. It was vented twice after 20 seconds and 30 seconds respectively. After a pressing period of 2½ minutes, the finished, decorated plate could be removed.

*Example 4*

A fiber fleece web of 100 grams/m.$^2$ weight was prepared from 40% 6 den. 66 nylon, 30 5 den. 66 nylon and 30% 3–7 den. 6 nylon waste. The thickness of the unit was 10 mm. The web was passed between two heated steel rolls with a roll gap of about 0.05 to 0.1 mm. at a temperature of 216° C. and a web speed of 7 m./minute, and thereby thermo-bonded. The final product had a thickness of about 0.1 mm. The product produced in this manner was treated with a solution of 60 parts of a water-soluble precondensate of Melamine formaldehyde resin, 32 parts of water, 8 parts of ethyl alcohol and 2 parts of a 50% aqueous solution of triethanolamine hydrochloride. By squeezing between two rubber rolls, the product was brought to a resin absorption of 60% (dry basis). The web impregnated in this manner was dried at 90° C. on a heated roll down to a content of volatile components of 5%.

A conventional granular, black molding composition of phenolformaldehyde resin was introduced into the cavity of a bowl mold of steel, the quantity of resin being such that upon the closing of the mold, a slight excess was squeezed out. Onto the resin powder there was placed a funneled cut-out of the decoration fleece (shaped as in FIG. 7) as made above. The mold was now closed by means of the top die and brought to a pressure of 380 kg./cm.² at a temperature of 160° C. After 20 seconds the pressure was released for venting. After reapplying pressure for 2½ minutes the final decorated bowl was removed.

*Example 5*

*Decorative fleece.*—A random-fiber fleece web of 50 grams/m.² consisting of 1.5 den. nylon 6 fibers (not dulled) 40 mm. length and 3 den. acetate fibers (degree of acetylation about 3) 40 mm. length was prepared in a mixture ratio of 50:50. The thickness of the unit produced in this manner was 7 mm. The web was passed between two heated steel rolls with a roll gap of about 0.05 to 0.1 mm., at a web speed of 7 m./minute and a temperature of 213° C. and thereby thermo-bonded. The final product had a thickness of about 0.1 mm. Onto cutouts of the web produced in this manner a decoration was applied by painting.

*Support fleece.*—A loose fiber fleece web of 150 grams/m.² consisting of nylon 6 fiber waste 3–7 den. and cotton waste white was produced in a mixture ratio of 50:50. The fiber web was treated with a solution of 60 parts of a water-soluble precondensate of Melamine formaldehyde resin, 32 parts of water, 8 parts of ethyl alcohol and 2 parts of a 50% aqueous solution of triethanolamine hydrochloride. The final support web formed had a resin content of 60% (dry basis).

Into the cavity of a cup mold preheated to 160° C. there were inserted punched pieces of the support web, shaped and funneled as in FIGS. 3 and 4, in sufficient quantity to produce a cup of the desired weight. A similarly punched and funneled piece of the decoration fleece was placed on the outside. The mold was now closed by means of the top die and brought to a pressure of 380 kg./cm.² at a temperature of 160° C. It was vented twice after 20 seconds and 30 seconds respectively. After a pressing period of 2½ minutes the final decorated cup could be removed.

*Example 6*

*Decoration fleece.*—A random-fiber fleece web of 75 grams/m.² of 1.5 den. 6 nylon fibers (not dulled) 25 mm. length and 1.8 den. acetate fiber (degree of acetylation about 3) 20 mm. length was prepared in a mixture ratio 50:50. The thickness of the unit was about 10 mm. The web was passed between two heated steel rolls with a roll gap of about 0.05 to 0.1 mm. at a web speed of 7 m./minute and a temperature of 211° C. and thereby thermo-bonded. The final product had a thickness of about 0.1 mm.

Colored decorations were painted onto the web produced in this manner.

After the painting the compacted fiber web was treated with a solution of 60 parts of a water-soluble precondensate of Melamine formaldehyde resin, 32 parts of water, 8 parts of ethyl alcohol and 2 parts of a 50% aqueous solution of triethanolamine hydrochloride (accelerator). By squeezing between two rubber rolls, the product was brought to a resin absorption of 65% (dry basis).

*Support fleece.*—A loose fiber fleece web of about 250 grams/m.² consisting of nylon 6 fiber waste 3–7 den. and cotton waste white was prepared in a mixture ration of 50:50. The fiber web was treated with a solution of 60 parts of a water-soluble procondensate of Melamine formaldehyde resin, 32 parts of water, 8 parts of ethyl alcohol and 2 parts of a 50% aqueous solution of triethanolamine hydrochloride. The final support web had a resin content of about 60% (dry basis).

Sufficient layers of the support web to fill out the mold upon pressing and a layer of the painted decoration web were punched out in semi-circular form, as shown in FIG. 3 of the drawing. The pieces were folded into the form of a cone, the decoration fleece lying on the outside of the cone, face out, as shown in FIG. 4. This cone-shaped structure was placed into the cavity of a cup mold (without handle) preheated to 160° C., and the mold was closed by the top die and brought to a pressure of 380 kg./cm.² at a temperature of 160° C. It was vented twice after 20 seconds and 30 seconds respectively. After a pressing time of 3 minutes, the finished decorated cup as shown in FIGS. 5 and 6 could be removed. The decoration extending over the lower sharp shoulder remained undisturbed and notwithstanding the severe angle of shape, the decoration fleece remained completely intact.

*Example 7*

*Decoration fleece.*—A fiber fleece web of 100 grams/m.² weight was prepared from 80% polyester (ethylene glycol terephthalic acid ester) fiber 3 den. 6 mm. pigmented or dyed a yellow color, and 20% nylon 6 waste 3–7 den. The thickness of the unit was 10 mm. The web was passed between two heated steel rolls with a roll gap of about 0.05 to 0.1 mm. at a web speed of 7 m./minute and a temperature of 214° C. and thereby thermo-bonded. The final product had a thickness of approximately 0.2 mm.

*Support fleece.*—A loose fiber web of 300 grams/m.² consisting of 50% nylon 6 fiber waste 3–7 den. and 50% cotton waste white was used. The web was impregnated with a dispersion of 15% by weight of polystyrene in trichlorethylene. After the removal by evaporation of the trichlorethylene, the support web formed had a resin absorption of about 60%.

Into the cavity of a cup mold heated to 140° C., there were placed punched pieces of the support web, shaped and funneled as in FIGS. 3 and 4, in sufficient number to give a slight excesss upon the pressing, a similarly cut-out piece of the yellow fleece having been placed on the outside. The mold was now closed by means of the top die and brought to a pressure of 380 kg./cm.² and a temperature of 140° C. for about 2 minutes without venting. It was cooled off to about 40° C. and then opened, whereupon the finished cup could be removed.

*Example 8*

A random fiber fleece web of 50 grams/m.² was prepared from 1.2 den. cold-drawn polyester (ethylene glycol terephthalic acid ester) fiber (25 mm.) and from the same but undrawn 6 den. fibers (25 mm.) in a weight ratio of 80:20. The thickness of the web was 7 mm. The web was passed between two heated steel rolls at a rate of speed of 7 m./minute with a roll gap of about 0.05 to 0.1 mm. at a temperature of 211° C. and thereby thermo-bonded. The final product had a thickness of about 0.1 mm.

Colored pictures were printed by offset printing on the web produced in this manner.

After the printing the thermo-bonded fiber web was treated with a dispersion of 15% by weight of polystyrene in trichlorethylene. After the removal by evaporation of the trichlorethylene the decorative fleece formed had a resin content of 60%.

Into the cavity of a disc-shaped injection mold, maintained at a temperature of 155° C., there was placed a circularly cut out piece of the decorative fleece. The disc hollow of the mold had an inner diameter of 40 mm. and a thickness of 2 mm. The injection duct had a diameter of 4.5 mm. Polystyrene (molecular weight 180,000) was injected into the mold on top of the decorative fleece with a pressure of 200 kg./cm². above atmospheric, at a temperature of 155° C. After opening the mold, the resulting disc-shaped article had the decorative fleece embedded adjacent one side thereof, with the decoration clearly visible and undistorted.

The example may be varied by coating the underside or both sides of the decorative fleece with the same polystyrene resin prior to the insertion of the fleece into the mold. This coating may be effected by applying a relatively viscous solvent solution of the polystyrene to the impregnated fleece and removing the solvent by evaporation.

Other thermoplastic resins may be used in the same manner set forth in the preceding example, giving the same results. Such resins are, for instance: polyvinyl alcohols and esters, cellulose acetate (2.5 acetylation), relatively low molecular polyolefins, and all other compounds conventionally known to be usable for injection molding. If the thermoplastic injection compound is not sufficiently transparent to permit visibility of the decoration therethrough, the decorative fleece is used face-down in the mold. In that case the face of the fleece is coated with a transparent thermoplastic material, being capable of integration with the backing compound under the conditions of temperature and pressure during the injection molding operation.

*Example 9*

*Decoration fleece.*—A random fiber fleece web of about 50 grams/m.$^2$ and composed of 1.5 den. nylon 66 fibers of 25 mm. length was immersed in an aqueous solution of 20% calcium bromide. The fleece was then passed through rubber rollers to remove excess impregnant, bringing the wet content of the fleece to about 150%. The wet fleece was then passed through a conventional decating machine having a steam heated roller. The felt pressing against the roller circumference was so adjusted that the felt pressure produced about a 70:1 reduction in thickness between the incoming and outgoing fleece. The steel roller was maintained at a temperature of about 140° C. and the rate of travel of the fleece was so adjusted that the aqueous content of the impregnant solution was reduced to about 10-20%. In the passage of the fleece web over the decatizer, the water evaporated and the calcium bromide solution became increasingly concentrated and caused a swelling of the polyamide fibers. The compression to which the fleece is subjected by the decatizer felt causes thermo-bonding of the contacting areas of the fleece. The fleece passing out of the decatizer was then subjected to washing with water to remove any calcium bromide.

Colored designs were then printed by silk-screening onto the thusly thermo-bonded fleece, and the same was thereafter impregnated by immersion with a solution of 60 parts of a water-soluble precondensate of Melamine formaldehyde resin (as hereinabove identified), 32 parts water, 8 parts ethyl alcohol and 2 parts of an aqueous 50% solution of triethanolamine hydrochloride (accelerator). The printed, upper side of the impregnated fleece was thereafter coated by brushing with an 80% slurry composition of 70 parts of a water-soluble precondensate of Melamine formaldehyde, 10 parts finely ground alpha-cellulose powder, 6 parts ethyl alcohol, 20 parts water and 2.5 parts of a 50% aqueous solution of triethanolamine hydrochloride (accelerator). The coating was limited to a thin surface application, any excess being removed with a doctor blade. The thusly impregnated, coated and thereafter dried fleece, showed a total dry content of resin of 70%.

In a further sample, the impregnated fleece was provided with the cellulose-containing coating compound in a somewhat greater thickness and in a still further sample, the first produced impregnated, coated and dried fleece, was given an additional coating of the cellulose-containing coating composition, and thereafter dried. In both cases still further improved results in disappearance of fiber structure, smoothness and gloss of the ultimate molded article was obtained.

*Support fleece.*—A loose fiber fleece of 250 grams/m.$^2$ composed of 3-7 den. 66 nylon fibers and white waste cotton in a mixture ratio of 50:50 was produced. This fiber fleece was then impregnated with a solution of 60 parts of a water-soluble precondensate of Melamine formaldehyde, 32 parts water, 8 parts ethyl alcohol and 2 parts of a 50% aqueous solution of triethanolamine hydrochloride (accelerator). The fleece was then subjected to light squeezing to remove excess impregnant, so as to obtain a dry resin content of 60%. The fleece was then dried.

Into the cavity of a cup mold, preheated to about 160° C., there were inserted punched pieces of the support web, shaped and funneled as illustrated in FIGS. 3 and 4, in sufficient quantity to produce a cup of the desired weight. A similarly punched and funneled piece of the decoration fleece was placed on the outside of the support fleece aggregate. The mold was now closed by means of the top die and brought to a pressure of 380 kg./cm.$^2$ at a temperature of 160° C. It was vented twice after 20 and 30 seconds respectively. After a pressing period of about 2½ minutes the final decorated cup was removed.

By reason of the additional resin cellulose coating, a fiber structure at the surface of the completed molded cup was no longer observable. Furthermore, the surface possessed a particularly good smoothness and a high gloss.

In lieu of the specific solvent mentioned in the preceding example for the accomplishing of the thermo-bonding operation in accordance with the invention, other solvents are usable and of course depend upon the particular fiber upon which they are to exercise a swelling or surface solvent action. Such swelling or solvent agents are well known in the art for the various fibers and may include, as is well understood, both inorganic and organic swelling agents or solvents. Typical additional inorganic solvent agents are, for instance, for polyamides such as nylon and acrylic fibers; calcium bromide, lithium bromide, $C(CNS)_2$ and $Mg(CNS)_2$; for polyester fibers: $Ca(CNS)_2$ or $Mg(CNS)_2$. The large number of organic solvents with a swelling or solvent action for the fibers usable in accordance with the invention as thermo-bonding fibers, are known and may be readily ascertained from any textbook or literature, the most common being phenols, such as o-creosol for nylon, amides, such as dimethyl formamide for acrylic fibers, and aromatic hydrocarbons, such as diphenyl for polyesters.

Any of the impregnated decorative fiber fleeces obtained in accordance with Examples 1-7 may be provided with the same or similar alpha-cellulose resin coating used in Example 9, with similarly good results, except that for the thermoplastic impregnated fleece in accordance with Example 8 there should be used a resin solution of the same, i.e., polystyrene, or therewith compatible thermoplastic resin. An illustrative solution, for instance, comprises a 15% solution of polystyrene and trichloroethylene and an amount of alpha-cellulose sufficient to furnish for every 70 parts by weight of polystyrene about 10 parts by weight of alpha-cellulose.

*Example 10*

A random-fiber fleece of about 100 grams/m.$^2$ was prepared from 1.5 den. polyester fibers (not dulled) 25 mm. length and 6 den. nylon 6 fibers 40 mm. length in a mixture ratio of 50:50. The thickness of the units was 20 mm. The fleece web was passed at a rate of 7 m./minute between two heated steel rolls with a roll gap of about 0.1 mm. and at a temperature of 211° C. and thereby thermo-bonded. The final product had a thickness of about 0.2 mm. The product produced in this manner was treated (by immersion) with a solution of 60 parts by weight of a water-soluble precondensate of Melamine-formaldehyde resin (as for instance marketed by the American Cyanamide Company under the designation Cymel-Melamin-Resin 405), 32 parts water, 8 parts ethyl alcohol and 2 parts of a 50% aqueous solution of triethanolamine hydrochloride (acceleration). By squeezing between two rubber rolls, the product was brought to a resin absorption of 65% (dry basis). The fleece impregnated in this manner was dried at 90° C. on a heated roll down to a content of volatile components of 5%. A flexible sheet is obtained which will not break apart even when scored.

In the cavity of a bowl mold which was preheated to 160° C., there was introduced a conventional alpha-cellulose-filler containing Melamine molding composition in granular form (as for instance marketed by the Ciba Co. under the designation Melopas NV). The quantity was such that a small excess was present. The mold was then closed by means of the upper die and brought to a pressure of 380 kg./cm.$^2$ at a temperature of 160° C. After 20 seconds, the pressure was released, and after 1 minute the mold was opened again. The bowl was now pre-shaped, but the Melamine resin was still not cured. The fleece, cut as illustrated in FIG. 7, was now placed on the preformed article. The mold was again closed and cured for 2½ minutes under the above mentioned conditions. The finished bowl was then removed from the mold and had an high impact strength, especially at the fleece covered surface.

I claim:

In the method for molding articles by injection molding, in which an injection moldable resin is injected into a mold cavity in flowable condition, the improvement which comprises positioning a non-woven design-carrying textile fiber fleece in the mold at least adjacent the surface thereof prior to the injection, and thereafter injecting the resin, to thereby form an integral one-piece molded article having said fleece embedded adjacent the surface thereof, said fleece having a thickness of between about 0.01–6 mm., possessing about 20–60% thermo-bonding fibers, self-cemetitiously thermo-bonded at their compression induced contact points, 10–80% non-thermo-bonding fibers, in which at least 40% by weight of the total fibers in said fleece substantially consist of synthetic fibers, in which at least 85% by weight of the total fibers have a fiber length of about 10–70 mm., in which said interstitial absorption capacity is at least 40% per dry weight of said impregnant resin, said thermo-bonding fibers in said fleece having a temperature of destructive flowability above the highest temperature reached in said molding at the highest molding pressure, and in which said fleece has been compressed while thermo-bonding at a ratio of fleece thickness to applied compression thickness of about 30:1 to 80:1.

References Cited in the file of this patent

UNITED STATES PATENTS

| | | |
|---|---|---|
| 270,538 | Bogert | Jan. 9, 1883 |
| 1,301,069 | MacDonal | Apr. 15, 1919 |
| 1,350,365 | Fuelling | Aug. 24, 1920 |
| 1,655,677 | Dickie et al. | Jan. 10, 1928 |
| 1,742,516 | Mills | Jan. 7, 1930 |
| 1,772,257 | Lefebure | Aug. 5, 1930 |
| 2,216,863 | Visman | Oct. 8, 1940 |
| 2,294,865 | Frankenthal et al. | Sept. 1, 1942 |
| 2,343,930 | Rowe | Mar. 14, 1944 |
| 2,377,393 | Wiley | June 5, 1945 |
| 2,413,823 | Gits | Jan. 7, 1947 |
| 2,439,137 | Keller | Apr. 6, 1948 |
| 2,449,595 | Ellis | Sept. 21, 1948 |
| 2,462,940 | Bowes | Mar. 1, 1949 |
| 2,502,926 | Chadwick et al. | Apr. 4, 1950 |
| 2,746,049 | Hudson | May 22, 1956 |
| 2,797,180 | Baldanza | June 25, 1957 |
| 2,811,770 | Young | Nov. 5, 1957 |
| 2,827,684 | Bromley | Mar. 25, 1958 |
| 2,874,419 | May et al. | Feb. 24, 1959 |